R. C. McCLAY.
HEADLIGHT.
APPLICATION FILED JAN. 6, 1908.
931,953.
Patented Aug. 24, 1909.
2 SHEETS—SHEET 2
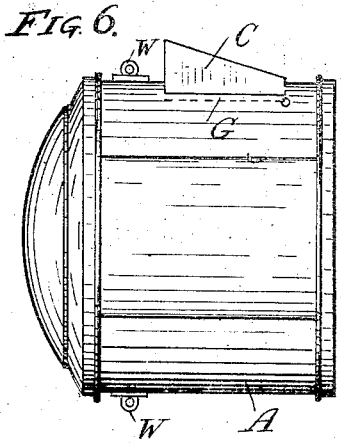
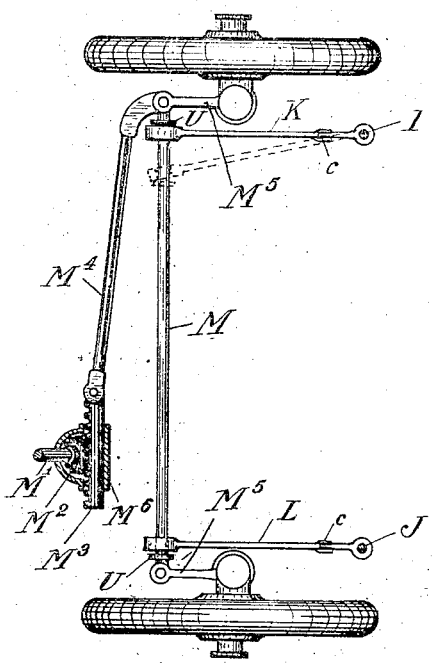
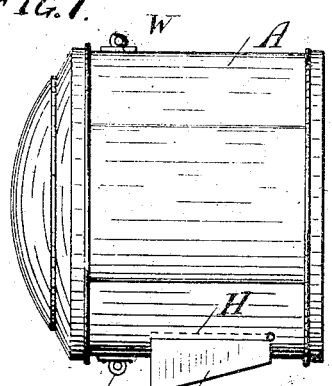
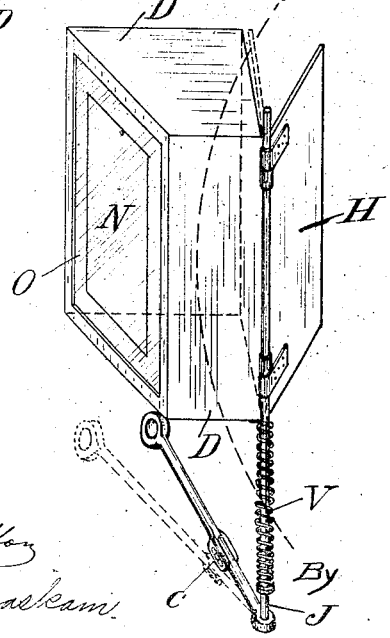
Witnesses
Inventor
Royal C. McClay
by John Day
Attorney.

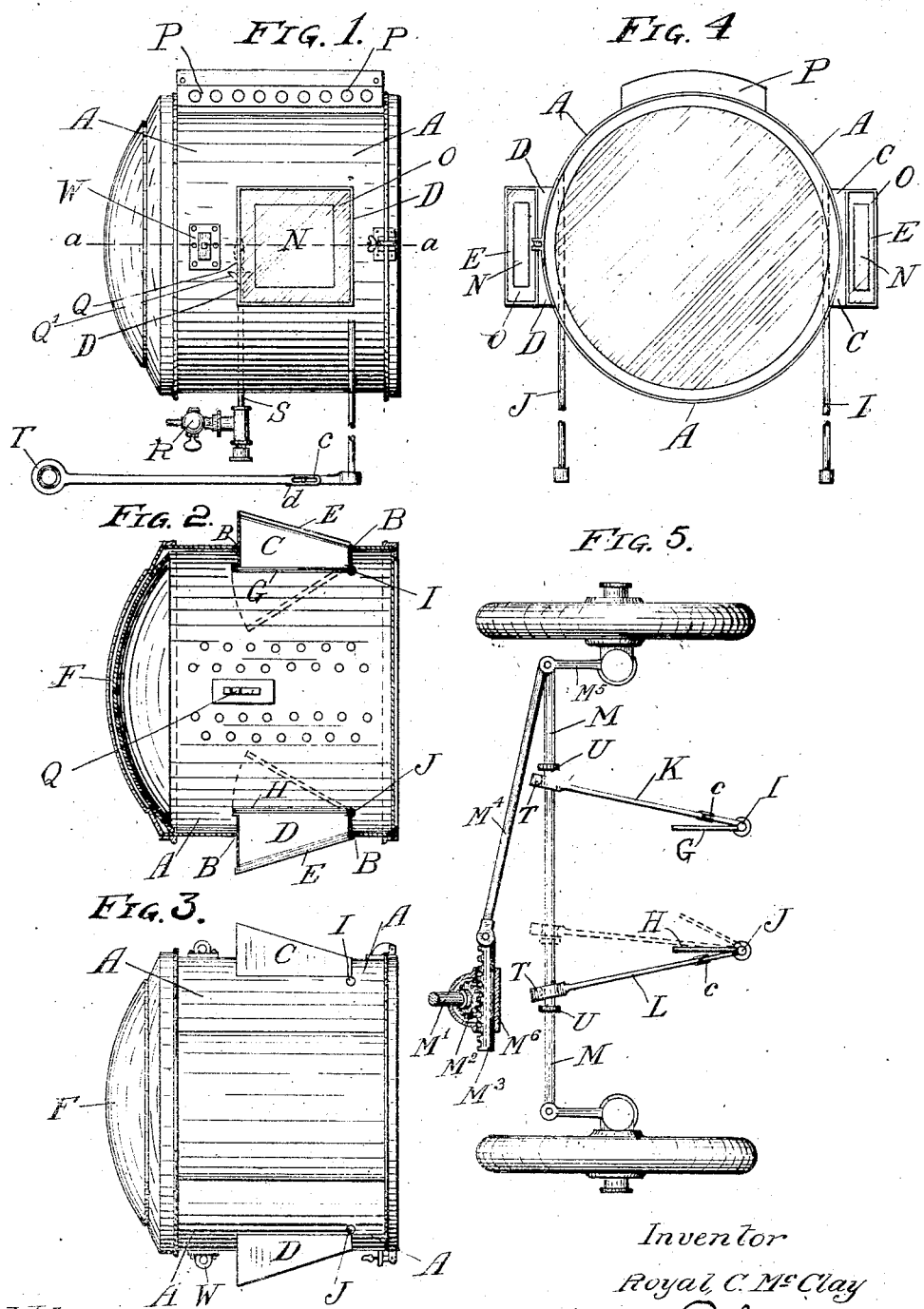

UNITED STATES PATENT OFFICE.

ROYAL C. McCLAY, OF LOS ANGELES, CALIFORNIA, ASSIGNOR, BY DIRECT AND MESNE ASSIGNMENTS, TO MECHANICAL AND ELECTRICAL APPLIANCES COMPANY, INCORPORATED, OF CARSON CITY, NEVADA.

HEADLIGHT.

931,953.  Specification of Letters Patent.  Patented Aug. 24, 1909.

Application filed January 6, 1908. Serial No. 410,182.

*To all whom it may concern:*

Be it known that I, ROYAL C. MCCLAY, of the city of Los Angeles, in the county of Los Angeles and State of California, have invented new and useful Improvements in Headlights, of which the following is a full, clear, and exact specification, reference being had to the annexed drawings and to the letters and figures marked thereon.

My said invention which relates to certain new and useful improvements in head lights, (sometimes known as head lamps) for vehicles such as automobiles, has for its object to secure additional safety to vehicles traveling, or being propelled in dark roads or streets, that is to say, after daylight, as well as to insure additional safety to persons contained in automobiles or other vehicles traveling in either direction upon a roadway or street, while one of the results of the use of my said invention is to illuminate the region immediately at the side of the automobile whenever such automobile in the dark may be turned in a right or left hand direction thereby enabling the driver of the automobile to see if there be any obstruction in that region to impede the progress of the automobile.

My said invention may be used in connection with a single head light placed in the center of the front of an automobile; or with two head lights placed one at each side of the front of an automobile.

My invention consists in applying to the usual casing of a head light or lamp, or of both headlights or lamps, as the case may be, a side casing or casings at the inner end of the interior part of which a pivoted shutter and reflector is carried. When the automobile is traveling straight ahead, then the reflector behind the source of light in the lamp throws a beam of light directly horizontal so as to illuminate the roadway or street straight ahead as hitherto, but when the driver or chauffeur of an automobile directs by means of the steering gear the automobile to travel either in a right or left hand direction, then the shutter and reflector, either the right or left hand shutter and reflector as the case may be, is opened by means of a lever operated by the rod connecting the stub axle levers of the front wheels of the automobile. The manner of operating the shutters from the steering gear by means of this connecting rod is hereinafter more fully described.

When either the right or left hand shutter and reflector is opened by the driver or chauffeur steering the automobile either to the right or left, then part of the light which until the shutter is opened had passed directly out through the front glass of the lamp falls upon the reflecting surface of the shutter and is by that reflecting surface directed as a beam of light thrown out laterally through the transparent glass front of the chamber whereof the reflector has been opened, and this side light not only illuminates the region into which the automobile is being steered, but a portion of the glass forming the outer inclined side of the chamber is also in part obscured so that the light passing through the obscured part of the glass being thereby diffused is seen by a person either in an automobile or other vehicle, or walking, whereby that person is shown and observes the direction in which the automobile is being steered.

Upon the annexed drawings, Figure 1, is a side elevation of an automobile head light constructed according to my invention, and illustrates a single head light as used in the center of the front of an automobile. Fig. 2, is a horizontal section of the same on the line $a$, $a$, Fig. 1. Fig. 3, is a plan of the head light corresponding to Figs. 1, and 2. Fig. 4, is a front elevation of the head light corresponding to Figs. 1, 2, and 3. Fig. 5, is a plan of part of the front running gear of an automobile showing the knuckles and their connections whereby the shutters and reflectors of the read light are operated, also showing part of the steering gear. Fig. 6, is a plan of a lefthand head light in cases where two head lights are used. Fig. 7, is a plan of a righthand head light in cases where two head lights are used. Fig. 8, is a plan of part of the running gear illustrating the means for operating the shutters and reflectors in both head lights as hereinafter more fully described. Fig. 9, is an enlarged view showing one of the side chambers of the head light, the shutter and reflector pivoted thereto, and the means for connecting the pivots of the shutter and reflector to the steering gear.

In Figs. 1, 2, 3, and 4, illustrating a single headlight for the center of the front of an automobile, the main casing A, thereof is preferably cylindrical as shown by these figures. At each side of the casing A, is an opening B, to admit of the fastening thereinto of two opposite rectangular casings C, and D, respectively. The outer faces of the casings C, and D, are inclined at an angle as shown in the drawings, so as to allow the glass E, in each casing to transmit laterally, some of the light reflected from the rear mirror F, when either of the reflectors G, or H, is moved inwardly upon its axis I, or J, into the position shown by dotted lines in Fig. 2, so that the light reflected laterally outward from one of the reflectors G, or H, as the case may be, is projected through either of the glasses E, according to which the shutters and reflectors G, or H, is opened, and the region outside the reflector is thereby strongly illuminated.

As shown at Figs. 1, 2, 3, and 5, both of the light reflecting shutters G, and H, are fastened to vertical pivots I, and J, respectively, and to the lower ends of the pivots I, and J, there are fastened levers K, and L, respectively, operated by the connecting rod M, as hereinafter described.

The central square portion N, of each glass E, is smooth and non-obscured, while the outer rectangular portion O, of each such glass E, is obscured for the purpose of diffusing the light transmitted therethrough and enabling it to be seen at a greater distance than the light passing through the clear unobscured central portion N. The glasses may be colored as either ruby red, or green, by "casing" their exterior with either of those colors in the manner so well known, and so long practiced in glass works, for coating the exterior surfaces of white glass with a thin casing of ruby or green glass.

The head light is provided with the usual ventilating cap P, for the allowance of the escape of the products of combustion of the light Q, within the head light. This light is of any character such as is commonly used in head lights, but an acetylene burner is preferred. The acetylene being admitted to the burner $Q^1$, by means of a pipe connected to the cock or tap R, whereby it passes up the tube S, to the burner $Q^1$, as shown at Figs. 1, and 2.

Each of the levers K, and L, is jointed at about the position marked c, in Fig. 5, but more especially shown in the larger view Fig. 1. This joint is pivoted, and the pivot moves in a horizontal slot d, at one end of the levers; the object of this joint being to enable the motion of the parts of an automobile in traveling to take place without putting any undue strain on the operative parts of my new or improved head light.

The inner part of each of the levers K, and L, is formed with an eye-piece T, through which the rod M, passes, and upon the rod M, and at the outer side of each of the eye-pieces T, there is fastened by a set screw, or otherwise, a collar U. One or the other of the collars U, when the rod M, is moved laterally, in either direction by the steering gear, presses against the eye-piece T, of one or the other of the levers K, and L, and in pressing upon either of the eye-pieces T, one of the collars, according to the direction in which the rod M, is moved, turns either of the reflecting shutters G, or H, so as to open the head light and allow the light to be reflected through the corresponding glass E, laterally and horizontally. When it is desired to discontinue the traveling of an automobile in the curved direction hereinbefore referred to, then the steering gear operates the rod M, in the opposite direction and closes either one or the other of the reflecting shutters G, or H, and in closing either of the shutters G, or H, against the inner edge of either of the casings C, or D, the light is thereby instantly stopped from projecting laterally and horizontally through either of the glasses E, so that when both reflecting shutters G, and H, are closed as shown in full lines in Fig. 2, the light of the head light again is thrown straight ahead.

In Fig. 5, the portion of the steering gear for operating the connecting rod M, is shown, and it consists of the steering post $M^1$, on the lower end of which the toothed pinion $M^2$, is carried. This pinion $M^2$, gears into the rack $M^3$, pivotally connected by the rod $M^4$, to the steering arm $M^5$, so that as the driver or chauffeur rotates the steering post $M^1$, to the right or left, he thereby moves the toothed rack $M^3$, correspondingly to the right or left, thereby causing the parallel moving rod M, to be moved to the right or left and to operate the reflecting shutters G, or H upon their respective pivots in the manner hereinbefore described, and shown upon the drawings. The pinion $M^2$, and the toothed rack $M^3$, are carried within the guide sheath $M^6$, in the ordinary manner, and this being well known and understood need not be herein further described.

With the object of insuring that the reflecting shutters G, or H, will close completely after having been opened, reference is now made to Fig. 9, of the drawings, which figure is drawn upon a larger scale than the other figures, in order to show that the pivot J, of the reflecting shutter H, is provided with a spiral spring V, the lower end of which is firmly attached to the pivot J, and the upper end of which is firmly attached to the chamber D, as shown.

The connection of the ends of the spiral spring V, with the pivot J, and the casing D, respectively, may be made by soldering the lower end of said spring to said pivot J, and the upper end of said spring to said casing D. The reflecting shutter H, is normally held closed against the inner face of the casing D, by the torsion of the spring V; the spring V, being held in torsion when its upper end is soldered or otherwise fastened to the bottom of the chamber D, and its lower end soldered or otherwise fastened to the bottom of the pivot J. In this manner the reflecting shutter H, is in its normal condition against the inner face of the casing D, and the functional mechanism hereinbefore described is to open the reflecting shutter H, against the torsion of the spiral spring V, while the tendency of the spiral spring V, is to always keep the reflecting shutter closed.

Although I have in the last preceding paragraph limited the description of the action of the shutter H, the pivot J, and the spiral spring V, to one of the reflecting shutters H, it is to be understood that when a central lamp is constructed according to my invention that the opposite reflecting shutter G, is similarly operated.

The head light shown at Figs. 6, and 7, being applicable in cases where two head lights are used, requires but one casing C, or D, in connection with which but one reflecting shutter G, or H, is used, so that when the reflecting shutters are operated primarily by or from the steering gear of the automobile then the single shutter in either the right or left hand head light as the case may be, is opened or closed by the gear modified in the position of the operative parts as shown at Fig. 8. In all other respects the head light shown at Figs. 6, and 7, is identical in operation and structure with the head light hereinbefore described and shown at Figs. 1, 2, 3, 4, 5, and 9.

It will be obvious that the head light hereinbefore described and shown upon the annexed drawings, besides being applicable for automobiles and other road or street vehicles, is applicable for other purposes, such for example as for the head or side lights of steam, gasolene, or electrically operated launches, ships and other floating structures.

It is explained that the colored and obscured portions of the plates of glass E, are preferably either red or green, such red or green being of about the same shades which are used in the larboard and starboard lights of a ship at sea. Either the central portion of each glass is unobscured, and the outer portion obscured, which is the preferred arrangement, or this order may be reversed.

The head light casing A, has fastened to its exterior as shown in the drawings, lugs W, with a cylindrical vertical hole therein, whereby the head lights are carried upon the automobile, or other vehicle, in connection with which my improved head lights are, or may be used, there being vertical rods upon the automobile or other vehicle, over and upon which the holes of the lugs W, fit, thereby supporting the head light or lights.

I claim as my invention.

1. In combination, a vehicle, steering gear therefor, a headlight mounted on said vehicle, said headlight having side openings, lateral casings projecting from said openings and having inclined outer ends, glass plates mounted in said outer ends, said plates being in part clear and unobscured, and in part colored and obscured, said casings being provided at their inner ends with reflecting shutters pivoted on vertical rods having downwardly extending ends, means for automatically operating said shutters from the steering gear, said means comprising crank arms on the lower ends of said rods, levers having at one end a pivoted and slotted connection with said crank arms, said levers being also connected with the steering gear.

2. In combination, a vehicle, steering gear therefor, two headlights mounted on said vehicle, each such headlight having an opening on its outer side, a lateral casing projecting from said opening and having an inclined outer end, a glass plate mounted in said outer end, said plates being in part clear and unobscured, and in part colored and obscured, said lateral casings being each provided at its inner end with a reflecting shutter pivoted on a vertical rod having a downwardly extending end, means for automatically operating said reflecting shutters from the steering gear, said means comprising a crank arm on the lower end of said rod, a lever having at one end a pivoted and slotted connection with said crank arm, said lever being also connected with the steering gear.

In testimony whereof, I have hereunto set my hand and seal at the city of Los Angeles aforesaid, in the presence of two subscribing witnesses.

ROYAL C. McCLAY. [L. s.]

Witnesses:
St. John Day,
J. D. Cory.